Dec. 6, 1966

H. ENG 3,289,405

PROPELLANT OXIDIZER MIXING SYSTEM FOR ROCKET MOTORS

Filed Jan. 16, 1964

Harvard Eng,
INVENTOR.

BY Harry M. Saragovitz
Edward J. Kelly
Herbert Bul
James E. Staudt

Dec. 6, 1966    H. ENG    3,289,405
PROPELLANT OXIDIZER MIXING SYSTEM FOR ROCKET MOTORS
Filed Jan. 16, 1964    2 Sheets-Sheet 2
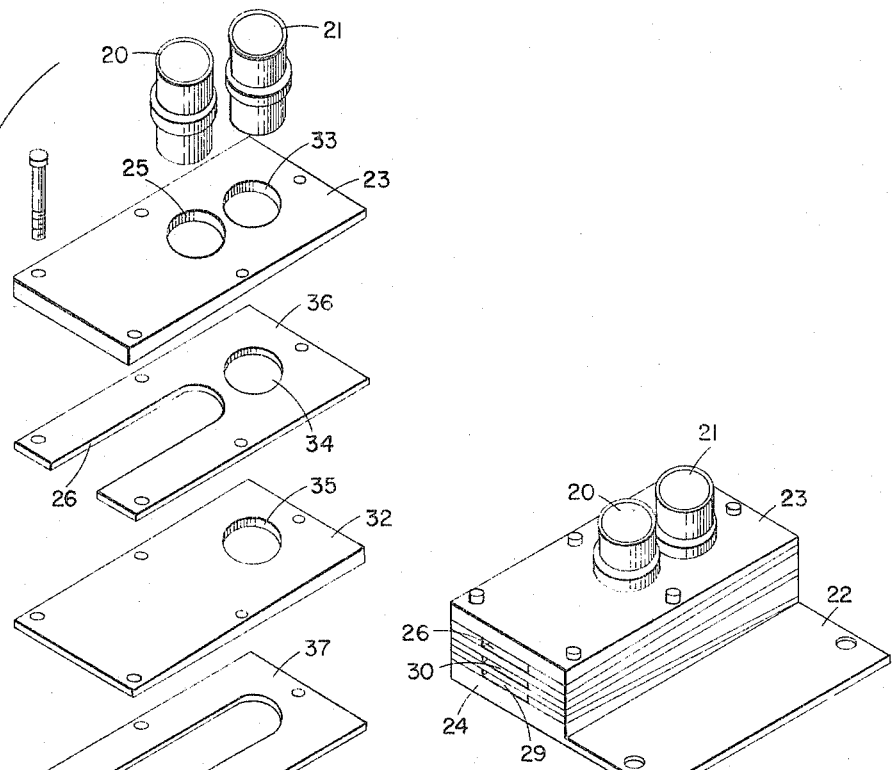
FIG. 5
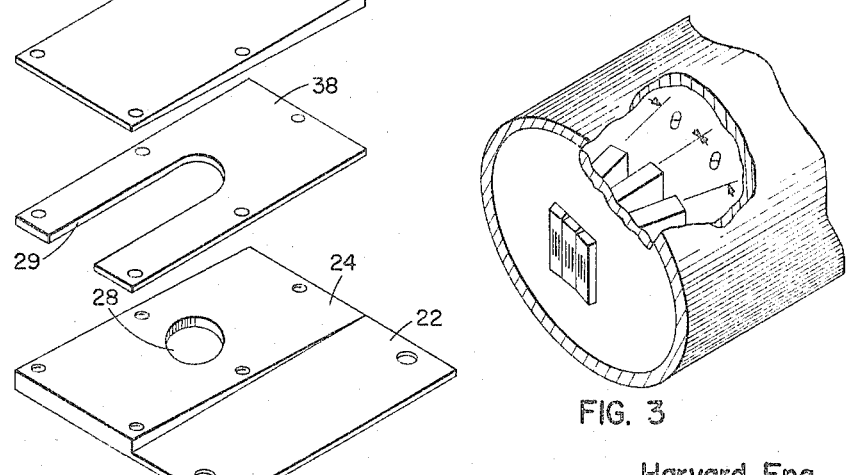
FIG. 3
FIG. 4
Harvard Eng,
  INVENTOR.
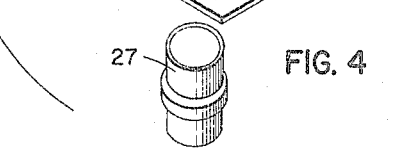

United States Patent Office 3,289,405
Patented Dec. 6, 1966

3,289,405
PROPELLANT OXIDIZER MIXING SYSTEM FOR ROCKET MOTORS
Harvard Eng, Huntsville, Ala., assignor to the United States of America as represented by the Secretary of the Army
Filed Jan. 16, 1964, Ser. No. 338,270
6 Claims. (Cl. 60—39.74)

The invention described herein may be manufactured and used by or for the Government of the United States of America for governmental purposes without the payment of any royalty thereon.

The present invention relates to a device for mixing rocket propellants and oxidizer in the combustion chamber of a rocket motor immediately before they are ignited.

In order to obtain maximum thrust from a liquid propellant rocket engine it is essential that the propellant be mixed with an exact proportion of oxidizer.

Prior devices have been directed primarily toward separate injection of the fuel and its oxidizer directly to the point of ignition thus utilizing the turbulence existing in the thrust chamber as the only means of mixing the fuel with the oxidizer.

After careful studies of the performance of rocket motors using this type mixing it has been determined that because of incomplete mixing between the propellant and its oxidizer the motors have been relatively inefficient as compared to their calculated potential assuming proper mixing of the fuel and its oxidizer.

The present invention relates to a device for accomplishing complete mixing of a propellant and its oxidizer before either reaches the immediate area of combustion.

Thus, the primary object of my invention is to provide a device which will achieve complete mixture between the rocket propellant and its oxidizer before their ignition.

Another object of my invention is to provide a simple and inexpensive means for mixing a rocket propellant with its oxidizer.

Still another object of my invention is to provide a fuel mixing device which is applicable to liquid propellant missiles now in use.

Other features of my invention will become apparent in due course from the following description hereof with reference to the accompanying drawing given primarily by way of example and in which:

FIGURE 3 is a partial section of a missile illustrating a lateral arrangement of injector mixing units.

FIGURE 4 is an exploded view of an injector mixing unit.

FIGURE 5 is a perspective view of the unit of FIGURE 4 in assembled form.

Figure 1:
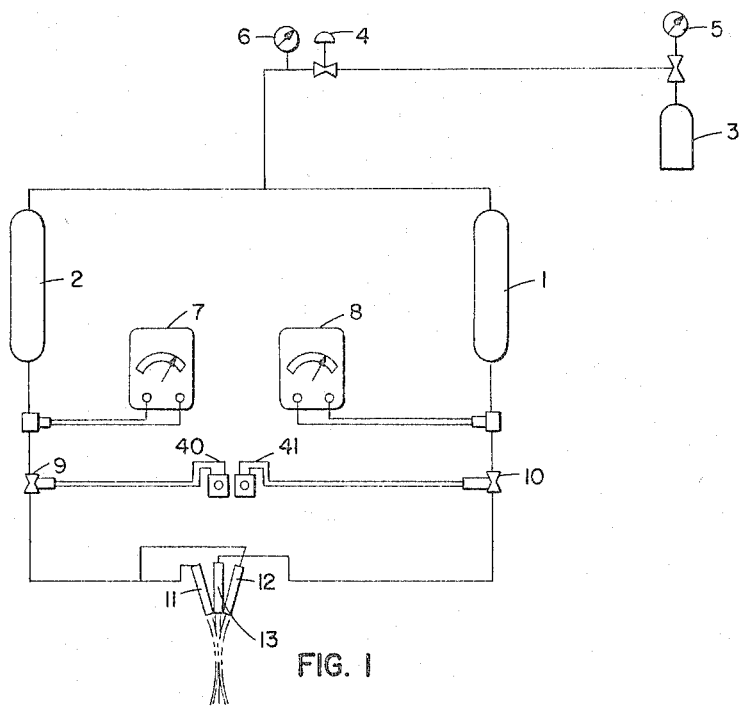
FIGURE 1 is a diagrammatic illustration of a propellant-oxidizer mixing device.

Referring now to FIGURE 1 the fuel supply system consists of a propellant tank 1, an oxidizer tank 2 and a control valve 4. Tanks 1 and 2 are maintained under constant pressure by a pressure supply tank 3. Gage 5 indicates the available pressure within the pressure supply tank and gage 6 indicates the pressure being applied to the fuel and propellant tanks. The volume of flow from the respective supply tanks is indicated by flow meters 7 and 8, and the flow rates may be varied remotely by servo controls 40, 41 which operate control valves 9 and 10 respectively. The oxidizer is supplied to a pair of injector ports 11 and 12 positioned on either side of a propellant injector port 13.

Figure 2:
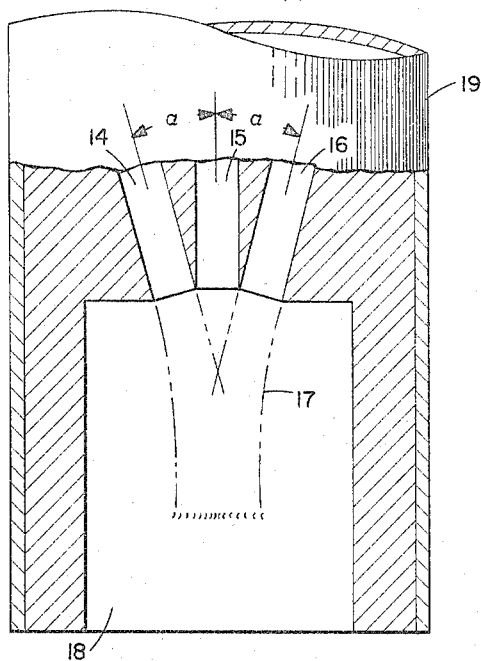
FIGURE 2 is a partial section of a missile illustrating diagrammatically a group of injector ports as utilized in an actual missile system.

The partial section illustrated in FIGURE 2 illustrates the general flow of the fluid as it passes through injector ports 14, 15 and 16 into the mixing area 17 and finally to the combustion area 18. It will be noted that the pressure under which the propellant oxidizer is supplied to the combustion chamber will determine the point at which the mixture will ignite. Thus, by regulating this pressure ignition of the fuel occurs immediately after complete mixture, as illustrated in the flow diagram of FIGURE 2. The missile 19 illustrated in FIGURE 2 is of a relatively small type and requires only one injector having three ports as shown. The size and use of the missile in question will of course determine the number of ports as well as the number of injector units necessary to provide satisfactory performance. FIGURE 3 illustrates a partial section of a missile utilizing three complete injector units, each unit having three injector ports. The injector units are mounted at an impingement angle $\theta$ relative to one another. In most applications the unit impingement angle is approximately the same as the port impingement angle $a$ illustrated in FIGURE 2. FIGURES 4 and 5 illustrate one type of fabricated mixer unit which utilized three ports defined by laterally arranged plates. Inlets 20 and 21 in this particular fabrication are positioned at 90° to the direction of flow in the ports. It is apparent that with minor modifications these inlets may be mounted in alignment with the ports to eliminate turning of the fluid stream. A flange 22 is provided for mounting the mixer injector unit. It is apparent that modifications would be required for mounting the mixer injector unit illustrated in FIGURES 4 and 5 in an arrangement such as illustrated in FIGURE 3. In this case the cover plates 23 and 24 would be replaced by thinner intermediate plates similar to plates 31 and 32. FIGURE 4 clearly illustrates the flow path of the propellant and oxidizer thru the device. Assuming the oxidizer would flow to the outside ports one oxidizer stream would begin at inlet 20, pass thru aperture 25 formed in outside plate 23 and would exit thru injector port 26. Oxidizer would also be supplied thru inlet port 27, located at the opposite side of the unit, passing thru aperture 28 formed in outside plate 24 exhausting thru injector port 29. It will be noted that the outside ports 26 and 29 are separated from an inside port 30 by means of intermediate plates of walls 31, 32. Propellant being supplied to the unit thru inlet 21 would pass through apertures 33, 34 and 35 exhausting thru inside port 30. It will be noted that intermediate plates 31 and 32 are slightly tapered while the surfaces of port plates 36, 37 and 38 are substantially parallel. The angle of taper of the intermediate plates may be varied and the port plates may of course also be tapered to obtain the desired fluid impingement angle.

Study has indicated that the taper angles $\alpha$ and $\theta$ illustrated in FIGURES 2 and 3 are very critical and that results were most satisfactory when these impingement angles were maintained between 0 and 15°.

In operation of the device the fluid passing through adjacent ports is mixed most rapidly at the film interface thru hydraulic shearing. When using extremely thin intermediate plates interfacial contact between the fluid streams will occur even though the impingement angle of the fluid streams is 0°, since the streams tend to enlarge somewhat immediately after emerging from the injector ports. Mixing was found to be good at relatively high impingement angles in the order of about 15° depending upon the injection pressure. Impingement angles of between 5° and 10° resulted in excellent mixing for nearly all existing fuel systems. Since mixing occurs most rapidly at the film interface through hydraulic shearing, thin films are essential as they afford the largest possible facial area for the least volume of flowing fluid. Thus, the studies indicated that the ratio of the port width to its thickness is of utmost importance. A port width of about 100 times the port thickness proved satisfactory while excellent results were achieved when using a width to thickness ratio of about 700 to 1. It is obvious that problems of fabrication set definite limits upon this ratio. If the ratio of propellant to fuel will permit, the thickness of the intermediate port may be approximately twice the thickness of the outside ports and yet achieve satisfactory mixing.

While the foregoing is a description of the preferred embodiment the following claims are intended to include those modifications and variations that are within the spirit and scope of the invention.

I claim:
1. A rocket motor fuel and oxidizer injector unit comprising: a stacked housing having laterally arranged thin plates with each of said plates having a thin injector port formed therein with the width of each injector port being from about 100 to about 700 times its thickness, spacer means including two plates that have their entire sides tapered and separating said three laterally arranged plates, said tapered sides aligning said injector ports at an impingement angle of from greater than 0° to about 15°, outside cover plates on oppositely facing sides of two of said three laterally arranged plates, and fluid communicating means in communication with each injector port whereby when propellants flow through said injector ports, said propellants will exit said ports in sheet form and have interfacial mixing.

2. A device as set forth in claim 1 wherein a plurality of injector units are mounted adjacent one another so as to align the ports of the respective units at approximately the same impingement angles as the angle between the ports within each respective injector unit.

3. A device for mixing a plurality of liquids comprising means for supplying each of said liquids to be mixed, means for controlling the flow rate of each of said liquids, means defining the cross sectional stream configuration of each of said liquids, said stream defining means having three injection ports that are laterally aligned and disposed in three plates that are separated by two intermediate plates, said intermediate plates having sides that are tapered from one end to the other in the direction of the flow through said injection ports, said tapered sides causing said three plates and said ports therein to be directed so as to cause surface engagement of said liquid streams at an angle greater than 0° and no greater than 15°.

4. A device as set forth in claim 3 wherein said injection ports issue a stream in which the cross sectional width is about 100 to about 700 times the cross sectional thickness of said stream.

5. A device as set forth in claim 4 wherein said angle of engagement is between about 5° and about 10°.

6. A device as set forth in claim 4 wherein said cross sectional width of said stream is about 700 times its cross sectional thickness.

References Cited by the Examiner

UNITED STATES PATENTS

| | | | |
|---|---|---|---|
| 1,881,345 | 10/1932 | Beatty et al. | 239—422 |
| 2,397,834 | 4/1946 | Bowman | 60—35.6 |
| 2,409,036 | 10/1946 | Goddard | 60—39.74 X |
| 2,482,260 | 9/1949 | Goddard | 60—39.74 X |
| 2,713,894 | 7/1955 | Sage | 239—423 X |
| 2,753,687 | 6/1956 | Wissley et al. | 60—35.6 X |
| 2,940,259 | 6/1960 | Mantler | 60—35.6 X |
| 3,136,123 | 6/1964 | Stein | 60—35.6 X |

MARK NEWMAN, *Primary Examiner.*

CARLTON R. CROYLE, *Examiner.*

D. HART, *Assistant Examiner.*